Patented Jan. 10, 1950

2,494,515

UNITED STATES PATENT OFFICE 2,494,515

SUBSTITUTED ETHERS OF CYCLIC SULFONES

Rupert C. Morris, Berkeley, and John L. Van Winkle, San Lorenzo, Calif., assignors to Shell Development Company, San Francisco, Calif., a corporation of Delaware No Drawing. Application May 4, 1946, Serial No. 667,484

14 Claims. (Cl. 260—329)

This invention relates to a novel and particularly useful class of compounds comprising the substituted ethers of cyclic sulfones. More particularly, the invention pertains to substituted ethers of sulfolanes and sulfolenes, and to methods for the preparation thereof. A particularly valuable group of compounds comprises the alkyl sulfolanyloxyalkyl sulfides.

The substituted ethers of sulfolanes and sulfolenes containing a five-membered heterocyclic ring consisting of four nuclear carbon atoms and a sulfonyl radical and have at least one of the nuclear carbon atoms directly attached to an oxygen atom which is attached to a divalent hydrocarbon radical, the remaining free bond of which is directly attached to a divalent member of the group consisting of —S—, —SO—, and —SO$_2$—, which divalent member is directly attached to a monovalent hydrocarbon radical. These substituted ethers may be represented by the formula

A—O—R$_1$—Z—R$_2$ wherein A is a monovalent five-membered heterocyclic ring consisting of four nuclear carbon atoms and a sulfonyl radical, all but one of the free bonds of the nuclear carbon atoms being satisfied by hydrogen atoms or organic radicals; R$_1$ is a divalent hydrocarbon radical, Z is a divalent substituent selected from the group consisting of —S—, —SO—, and —SO$_2$—, and R$_2$ is a monovalent hydrocarbon radical.

The novel substituted ethers of the sulfolanes of the invention contain a five-membered heterocyclic ring consisting of four saturated nuclear carbon atoms and a sulfonyl radical, and have at least one of the nuclear carbon atoms directly attached to an oxygen atom which is linked directly to a divalent hydrocarbon radical, the remaining free bond of which is directly attached to a member of the divalent group consisting of the divalent sulfide, sulfoxyl, and sulfonyl, radicals, which divalent member is directly attached to a monovalent hydrocarbon radical. When A is a sulfolanyl radical and Z is —S—, a hydrocarbyl sulfolanyloxyhydrocarbyl sulfide is represented; and so forth. The particularly valuable alkyl sulfolanyloxyalkyl sulfides may be represented by the formula

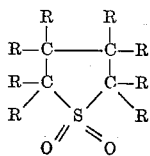

wherein at least one of the R's is an alkylthioalkoxy radical, and the remaining R's are members of the group consisting of the hydrogen atom and the organic radicals. For example, especially useful alkyl (3-sulfolanyloxy)alkyl sulfides are represented by the formula

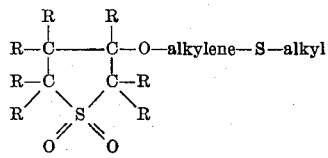

wherein each R is a member of the group consisting of the hydrogen atom and the alkyl radicals.

The substituted ethers of the sulfolenes contain a five-membered heterocyclic ring consisting of four nuclear carbon atoms and a sulfonyl radical having a double bond between two vicinal nuclear carbon atoms, and have at least one of the nuclear carbon atoms directly attached to an oxygen atom which is attached directly to a divalent hydrocarbon radical, the remaining free bond of which is directly attached to a member of the divalent group consisting of the divalent sulfide, sulfoxyl, sulfonyl, radicals, said divalent member being directly attached to a monovalent hydrocarbon radical. The alkyl sulfolenyloxyalkyl sulfides are represented by the formulae

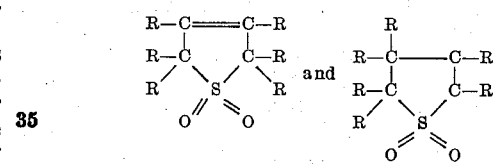

Wherein at least one of the R's is an alkylthioalkoxy radical and the remaining R's are members of the group consisting of the hydrogen atom and the organic radicals.

A valuable group of substituted ethers of the invention contain a five-membered heterocyclic ring consisting of four nuclear carbon atoms and a sulfonyl radical and have a nuclear carbon atom directly attached to an oxygen atom which is directly attached to a divalent hydrocarbon radical which is linked directly to a sulfur atom having its one remaining free bond directly attached to a monovalent hydrocarbon radical, the remaining free bonds of the nuclear carbon atoms of the heterocyclic ring being directly attached to hydrogen atoms or alkyl radicals.

The divalent hydrocarbon radicals which R$_1$ represents are the divalent radicals formed by the removal of two hydrogen atoms from a hydrocarbon, which may be cyclic or acyclic, saturated, unsaturated or aromatic. However, $R_1$ preferably represents the divalent radical formed by removing two hydrogen atoms from an acyclic saturated aliphatic hydrocarbon, i.e. an alkylene radical such as methylene, ethylene, propylene, butylene, and the like.

The monovalent hydrocarbon radical which $R_2$ represents may be cyclic or acyclic, saturated, unsaturated or aromatic, such as the alkyl, alkenyl, aryl, alkaryl, alkenaryl, aralkyl, aralkenyl, cycloalkyl and cycloalkenyl radicals. Suitable monovalent hydrocarbon radicals are methyl, ethyl, propyl, isopropyl, butyl, sec-butyl, tert-butyl, amyl, hexyl, cyclohexyl, cyclohexenyl, 3,3,5-trimethyl-2-cyclohexenyl, 3,3,5 - trimethyl-3-cyclohexenyl, 3,3,5-trimethylcyclohexyl, vinyl, isopropenyl, allyl, methallyl, crotyl, tiglyl, cinnamyl, phenyl, benzyl, cresyl, xylyl, styryl, naphthyl, cyclopentadienyl, propargyl, and the like, and their homologues. Valuable compounds are represented when the hydrocarbon radical which $R_2$ represents is of saturated character, i. e. not readily hydrogenatable, such as the alkyl, cycloalkyl, aryl, aralkyl and alkaryl radicals, and more preferably the alkyl radicals. Examples of the saturated hydrocarbon radicals include methyl, ethyl, propyl, isopropyl, butyl, isobutyl, sec-butyl, tert-butyl, cyclohexyl, cyclopropyl, phenyl, xylyl, benzyl, cresyl and 3,3,5-trimethylcyclohexyl.

Alkyl sulfolanyloxyalkyl sulfides having the oxygen atom directly attached to the nuclear carbon atom in the 3-position of the sulfolane nucleus, i. e. the alkyl (3-sulfolanyloxy) alkyl sulfides, and having the free bonds of the nuclear carbon atoms of the sulfolane nucleus satisfied by hydrogen atoms or alkyl radicals, possess unexpectedly valuable properties which make them of particular use in various industrial applications. An example of a particularly valuable alkyl(3-sulfolanyloxy) alkyl sulfide is n-butyl 3-(3-sulfolanyloxy)-propyl sulfide.

The numbering system of the sulfolane or sulfolene ring is indicated below:

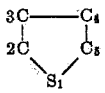

This is in accordance with the accepted system of numbering as exemplified by the compounds of this type of ring structure given on page 44 of Patterson and Capell, The Ring Index, Reinhold Publishing Corp., New York, 1940; Am. Chem. Soc. Monograph No. 84. The system may be exemplified by the compound having the structure

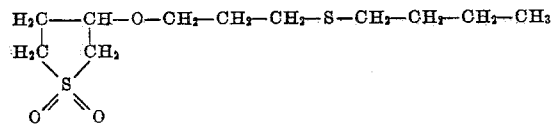

which is termed n-butyl 3-(3-sulfolanyloxy)-propyl sulfide. The compound having the structure

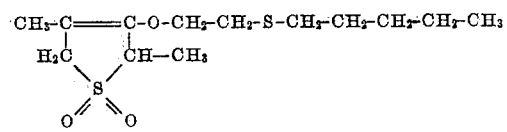

is termed amyl (2,4 - dimethyl - 3 - sulfolen - 3-yloxy)-2-ethyl sulfide.

The substituted sulfolanyl ethers of the invention may be produced by reacting an unsaturated sulfolanyl ether with a compound corresponding to the formula $H-Z-R_2$, Z and $R_2$ representing the radicals described hereinabove. For example, a particularly convenient method for the preparation of the alkyl sulfolanyloxyalkyl sulfides comprises reacting an alkenyl sulfolanyl ether with an alkyl mercaptan in the presence of a peroxide and a metal halide catalyst, in the absence or presence of irradiation with ultraviolet light. This method is of particular value in preparing alkyl 3-(sulfolanyloxy)-propyl sulfides by reacting an alkyl mercaptan with an allyl-type sulfolanyl ether which contains a five-membered heterocyclic ring consisting of four saturated nuclear carbon atoms and a sulfonyl radical and has directly attached to at least one of the nuclear carbon atoms an oxygen atom which is linked directly to a saturated carbon atom which is directly attached to an olefinic linkage between two carbon atoms of aliphatic character. This reaction takes place in the presence of an organic peroxide such as benzoyl peroxide and the like. Although any temperature may be maintained, the reaction is preferably carried out at a temperature between about 25° C. and about 125° C. An efficient reaction is favored by the presence of a metal halide catalyst, preferably a halide of a polyvalent metal in a low state of valence, e. g. ferrous chloride.

Another method of manufacturing the new sulfolanyloxyalkyl and sulfolanyloxyaryl sulfides of the invention comprises reaction of haloalkyl sulfolanyl ethers, which may be produced, for instance, by treating a sulfolene with a halogenated aliphatic monohydroxy alcohol in the presence of a small amount of base, with a mercaptide. The process may be represented by the following equations:

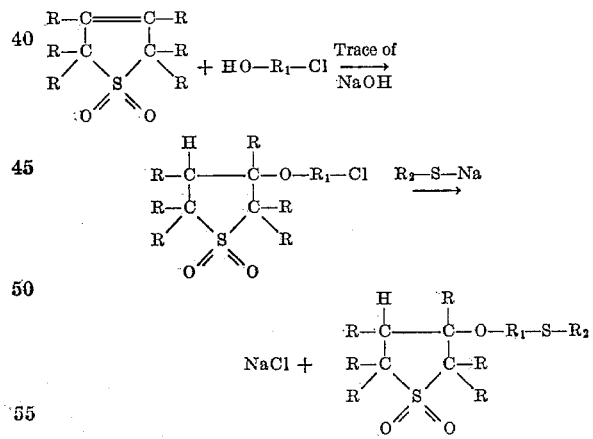

where R represents a hydrogen atom or an organic radical, preferably an aliphatic or aromatic hydrocarbon radical of not more than 18 carbon atoms, $R_1$ represents an alkylene radical preferably of not more than 12 carbon atoms, and $R_2$ represents an alkyl or aryl radical. Instead of sodium mercaptides, potassium, lead or other suitable mercaptides may be used. Aliphatic mercaptides having not more than about 18 carbon atoms are preferred and most preferably alkyl mercaptides having from 1 to 12 carbon atoms per molecule are employed. A stoichiometric excess of the chosen mercaptide or mixture of mercaptides is advantageous in the reaction which is preferably carried out at a temperature in the range of about 50° C. to 200° C. In the reaction with the mercaptides haloalkyl ethers of sulfolanols wherein the ether oxygen atom is attached to a different nuclear carbon atom of the cyclic sulfone ring than that illustrated in the foregoing equation may, of course, be used.

A substituted sulfolenyl ether may be produced by reacting sulfur dioxide with the appropriate conjugated diolefinic compound having one of the unsaturated carbon atoms directly linked to $-O-R_1-Z-R_2$. This reaction may be represented by the general equation

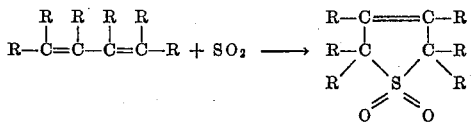

wherein at least one of the R's is $-O-R_1-S-R_2$, e. g. -O-alkylene-S-alkyl, and the remaining R's are members of the group consisting of the hydrogen atom and the organic radicals, preferably hydrogent atoms or alkyl radicals.

The novel substituted ethers of cyclic sulfones of the invention find utility in a large variety of industries. For example, the substituted ethers, and more particularly the sulfolanyloxy and sulfolenyloxy sulfides, may be used as insecticides, fungicides and parasiticides or as ingredients of insecticidal, fungicidal and parasiticidal compositions, and as ingredients for use in the manufacture of varnishes, polishes, and the like. Also, these novel compounds may be employed in the preparation of natural or synthetic rubbers, resins, plastics, etc., and they are of value in the resin and lacquer industry as solvents and plasticizers for the manufacture of dopes, fabric coatings, sprays and molding compositions. The substituted ethers of cyclic sulfones are of use as antioxidants, pourpoint depressants, extracting agents, ingredients in cosmetics, as base materials and fixing agents in the preparation of perfumes, as softening agents for the leather industry and as selective solvents in extractive distillation processes. Moreover, the sulfolenyloxy and the sulfolanyloxy sulfides particularly are valuable substances to be used as addition agents in lubricating oils, greases, and as detergents, as well as for a variety of other purposes such as for intermediates in organic syntheses.

The alkyl sulfolanyloxyalkyl sulfides and more particularly the alkyl sulfolanyloxypropyl sulfides, such as n-butyl 3 - (3 - sulfolanyloxy)-propyl sulfide and amyl 3 - (3 - sulfolanyloxy)-propyl sulfide, are of outstanding value as plasticizers and softeners for treating synthetic rubbers, resins and plastics.

The following examples serve to illustrate the invention.

*Example I*

A flask was charged with about 190 parts by weight of n-butyl mercaptan and about 371 parts by weight of allyl 3-sulfolanyl ether. Approximately 3 to 5 parts by weight of ferrous chloride and about 3 to 5 parts by weight of benzoyl peroxide were added and the mixture heated at about 70° C. to 80° C. for several hours. There was recovered from the reaction mixture approximately an 18.5% yield of n-butyl 3-(3-sulfolanyloxy)-propyl sulfide boiling at 175° C. to 178° C. at about 1 mm. and having the following physical properties:

$d_4^{20}$ ---------------------------------- 1.144
$n_D^{20}$ ---------------------------------- 1.5052

*Example II*

A mixture of about 624 grams of mixed amyl mercaptans and approximately 150 cc. of peroxide containing ethyl tertiary amyl ether were added to about 528 grams of allyl 3-sulfolanyl ether. Approximately 10 grams of anhydrous ferrous chloride were added to the reaction mixture at the start, and the ether-mercaptan solution was added in portions so that the temperature did not rise above about 45° C. The reaction mixture was irradiated with ultraviolet light and more peroxide containing ether was added. There was recovered approximately a 48.5% yield of amyl 3-(3-sulfolanyloxy)-propyl sulfide having a boiling point of 200° C. to 208° C. at 2 mm. and having the following physical properties:

$d_4^{20}$ ---------------------------------- 1.1265
$n_D^{20}$ ---------------------------------- 1.5024

*Example III*

Following the procedure described in Example I, isopropyl mercaptan and allyl 3-sulfolanyl ether are reacted in the presence of benzoyl peroxide to produce isopropyl 3-(3-sulfolanyloxy)-propyl sulfide.

*Example IV*

When ethyl mercaptan and vinyl 2-sulfolanyl ether are reacted according to the process of Example II, ethyl 2-(2-sulfolanyloxy)-ethyl sulfide is formed.

*Example V*

Thiophenol and allyl 2,4-dimethyl-4-sulfolanyl ether are reacted in the presence of benzoyl peroxide and ferrous chloride according to the procedure described in Example I to obtain phenyl 3-(2,4-dimethyl-4-sulfolanyloxy)-propyl sulfide.

*Example VI*

Propyl 3 - (4-methyl-2,4-pentadien-3-yloxy)-propyl sulfide is treated with approximately an equimolar amount of sulfur dioxide in the presence of pyrogallol at a temperature between about 95° C. and about 105° C. to obtain propyl 3-(2,4-dimethyl-3-sulfolen-3-yloxy)-propyl sulfide.

*Example VII*

A mixture of about 177 parts by weight of 3-sulfolene and 483 parts of ethylene chlorhydrin with about 2 parts by weight of 10% aqueous sodium hydroxide is reacted in a water bath at about 50° C. for about three hours to produce a substantial yield of beta-chloroethyl 3-sulfolanyl ether which is recovered by filtering and fractionally distilling the product. This ether is treated at about 100° C. with a slight molecular excess of methyl sodium mercaptide to produce methyl 2-(3-sulfolanyloxy)-ethyl sulfide.

According to the general procedures outlined above, the following novel compounds are also prepared: methyl 3 - (3 - sulfolanyloxy)-isobutyl sulfide, hexyl 2-(3,4-dimethyl-3-sulfolanyloxy)-propyl sulfide, 3,3,5-trimethyl-cyclohexyl 3-(2-sulfolanyloxy)-propyl sulfide, amyl 2-(2,4-diethyl-3-sulfolen-3-yloxy)-ethyl sulfide, and isophoryl p-(3-sulfolanyloxy)-phenyl sulfide.

The alkyl and aryl sulfolanyloxyalkyl and sulfolanyloxyaryl sulfides of the invention may be readily converted to the corresponding novel sulfoxides or sulfones by oxidation with suitable agents. Thus, for example, treatment with hydrogen peroxide may be used to produce new alkyl and aryl sulfolanyloxyalkyl and sulfolanyloxy sulfoxides according to the equation:

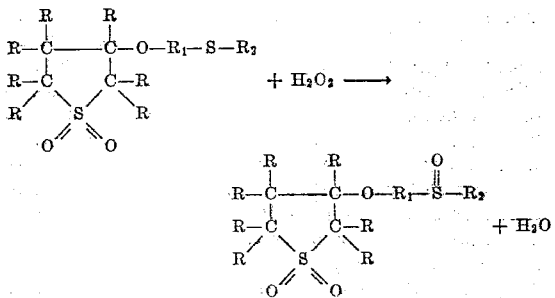

By the use of sodium hypochlorite, excess $H_2O_2$ or $KMnO_4$ as the oxidizing agents sulfones may be produced as illustrated by the following equation:

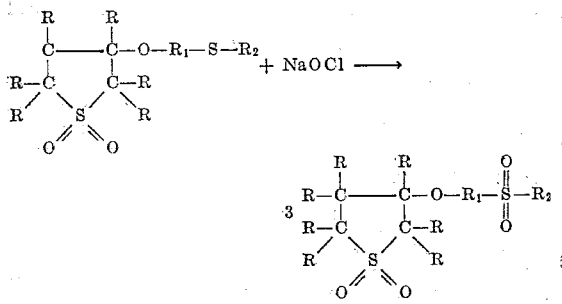

In these equations R, $R_1$ and $R_2$ represent the atoms or groups indicated in the previously discussed equations. It will be understood that these equations are intended to be illustrative only and that the ether oxygen atom in the starting compound may be attached to a different nuclear carbon atom of the cyclic sulfone ring without interfering with the reaction. Thus, for example, oxidation of the ethyl 2-(2-sulfolanyloxy)-ethyl sulfide produced according to Example IV gives ethyl 2-(2-sulfolanyloxy)-ethyl sulfoxide

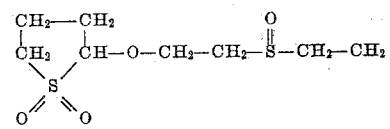

when hydrogen peroxide is used as the oxidizing agent, and ethyl 2-(2-sulfolanyloxy)-ethyl sulfone

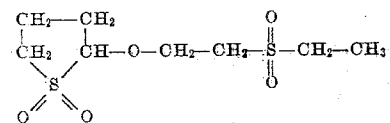

when sodium hypochlorite is used as the oxidizing agent. In the same way, mixed amyl 3-(3-sulfolanyloxy)-propyl sulfoxides and sulfones are obtained from the product of Example II, while n-butyl 3-(3-sulfolanyloxy)-propyl sulfoxide and sulfone are produced when the n-butyl 3-(3-sulfolanyloxy)-propyl sulfide of Example I is similarly oxidized. Phenyl 3-(2,4-dimethyl-4-sulfolanyloxy)-propyl sulfone is obtained by treating phenyl 3-(2,4-dimethyl-4-sulfolanyloxy)-propyl sulfide with nitric acid, and isopropyl p-(3-sulfolanyloxy)-phenyl sulfone is produced from isopropyl p-(3-sulfolanyloxy)-phenyl sulfide. Amyl 2-(2,4-diethyl-3-sulfolanyloxy)-isobutyl sulfone is similarly produced from amyl 2-(2,4-diethyl-3-sulfolanyloxy)-isobutyl sulfide.

Other novel compounds which may be prepared are, for instance, tert.butyl 3-(3-sulfolanyloxy)-propyl sulfide, ethyl 3-(3-sulfolanyloxy)-propyl sulfone, propyl 3-(3-sulfolen-3-yloxy)-butyl sulfone and cyclohexyl 2-(2-sulfolanyloxy)-ethyl sulfone.

We claim as our invention:

1. A compound containing a five-membered heterocyclic nucleus consisting of four nuclear carbon atoms and one sulfonyl radical wherein at least one of the nuclear carbon atoms is directly attached to an oxygen atom which is linked directly to a divalent alkylene radical, the remaining free bond of which is directly attached to a member of the divalent group consisting of the divalent sulfide, sulfoxyl, and sulfonyl radicals, which divalent member is directly attached to a monovalent hydrocarbon radical, the remaining free bonds of the nuclear carbon atom being directly attached to members of the group consisting of the hydrogen atom and the alkyl radicals.

2. A compound containing a five-membered heterocyclic nucleus consisting of four saturated nuclear carbon atoms and one sulfonyl radical wherein one of the nuclear carbon atoms is directly attached to an oxygen atom which is linked directly to an alkylene radical which is directly attached to a member of the group consisting of —S—, —SO—, and —$SO_2$—, said member being directly attached to an alkyl radical, the remaining free bonds of the nuclear carbon atom being directly attached to members of the group consisting of the hydrogen atom and the alkyl radicals.

3. A compound containing a five-membered heterocyclic nucleus consisting of four saturated nuclear carbon atoms and one sulfonyl radical wherein one of the nuclear carbon atoms is directly attached to an oxygen atom which is linked directly to an alkylene radical which is directly attached to a divalent sulfur atom which has its one remaining free bond satisfied by an alkyl radical, the remaining free bonds of the nuclear carbon atoms being directly attached to members of the group consisting of the hydrogen atom and the alkyl radicals.

4. A compound containing a five-membered heterocyclic nucleus consisting of four nuclear carbon atoms and one sulfonyl radical and containing an olefinic linkage between two vicinal nuclear carbon atoms, wherein one of the nuclear carbon atoms is directly attached to an oxygen atom which is linked directly to an alkylene radical which is directly attached to a divalent sulfur atom which has its one remaining free bond satisfied by an alkyl radical, the remaining free bonds of the nuclear carbon atoms being directly attached to members of the group consisting of the hydrogen atom and the alkyl radicals.

5. A compound containing a five-membered heterocyclic nucleus consisting of four saturated nuclear carbon atoms and one sulfonyl radical wherein a nuclear carbon atom once removed from the sulfonyl radical is directly attached to an oxygen atom which is linked directly to a propylene radical which is directly attached to a divalent sulfur atom having its remaining free bond satisfied by an alkyl radical, the remaining free bonds of the nuclear carbon atoms being directly attached to members of the group consisting of the hydrogen atom and the alkyl radicals.

6. A compound containing a five-membered heterocyclic nucleus consisting of four nuclear carbon atoms and one sulfonyl radical and containing an olefinic linkage between the two nuclear carbon atoms once removed from the sulfonyl radical, wherein one of the unsaturated nuclear carbon atoms is directly attached to an oxygen atom which is linked directly to a propylene radical which is directly attached to a divalent sulfur atom having its remaining free bond satisfied by an alkyl radical, the remaining free bonds of the nuclear carbon atoms being directly attached to members of the group consisting of the hydrogen atom and the alkyl radicals.

7. An alkyl 3-(3-sulfolanyloxy)-propyl sulfide of the formula

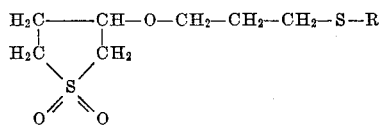

where R represents an alkyl radical.

8. An alkyl 3-(3-sulfolen-3-yloxy)-propyl sulfide of the formula

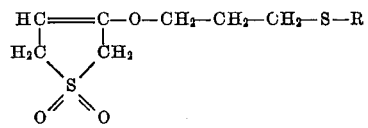

where R represents an alkyl radical.

9. n-Butyl 3-(3-sulfolanyloxy)-propyl sulfide of the formula

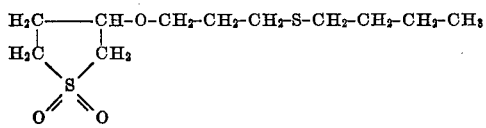

10. Amyl 3-(3-sulfolanyloxy)-propyl sulfide of the formula

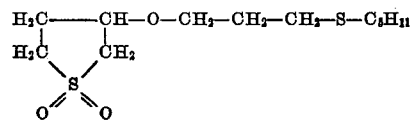

11. Propyl 3 - (2,4 - dimethyl - 3 - sulfolen - 3-yloxy)-propyl sulfide of the formula

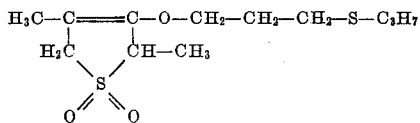

12. A process for the production of an alkyl sulfolanyloxyalkyl sulfide which comprises reacting an alkyl mercaptan and an alkenyl sulfolanyl ether in the presence of an organic peroxide and a halide of a polyvalent metal, said metal being in its lowest state of valence.

13. A process for the production of an alkyl sulfoanyloxypropyl sulfide which comprises reacting an alkyl mercaptan and an allyl sulfolanyl ether in the presence of an organic peroxide and a ferrous halide.

14. A process for the production of n-butyl 3-(3-sulfolanyloxy)-propyl sulfide which comprises reacting n-butyl mercaptan and allyl 3-sulfolanyl ether in the presence of benzoyl peroxide and ferrous chloride at a temperature of about 70° C. to about 80° C.

RUPERT C. MORRIS.
JOHN L. VAN WINKLE.

REFERENCES CITED

The following references are of record in the file of this patent:

UNITED STATES PATENTS

| Number | Name | Date |
|---|---|---|
| 2,189,367 | Muth | Feb. 6, 1940 |
| 2,241,798 | Delfs | Aug. 4, 1942 |
| 2,419,082 | Morris et al. | Apr. 15, 1947 |